Dec. 30, 1952  T. F. YOUNG  2,623,935

AUTOMOTIVE SIGNAL LIGHT SYSTEM

Filed March 16, 1949

INVENTOR.
THOMAS F. YOUNG
BY
Brasier & Harding
ATTORNEYS

Patented Dec. 30, 1952

2,623,935

UNITED STATES PATENT OFFICE 2,623,935

AUTOMOTIVE SIGNAL LIGHT SYSTEM

Thomas F. Young, Erlton, N. J., assignor to Arrow Safety Device Company, Mount Holly, N. J., a corporation of New Jersey Application March 16, 1949, Serial No. 81,669

2 Claims. (Cl. 177—339)

This invention relates to a control switch assembly and signal system employed for controlling turn and stop light signals such as are commonly used on motor vehicles. The switch assembly may be mounted on the steering column and operated by the driver providing a control for the signal lights and also providing an indication to the driver of improper operation of the signal system.

It is an object of this invention to provide a control switch of simple, economical and practical construction which may be mounted on the steering column of a motor vehicle and employed by the driver to control turn and stop lights.

Another object of the invention is to provide a pilot light which will indicate to the driver the existence of a failure in the signal system.

These and other objects of the invention will become apparent from the following description read in conjunction with the accompanying drawings, in which.

Figure 2:
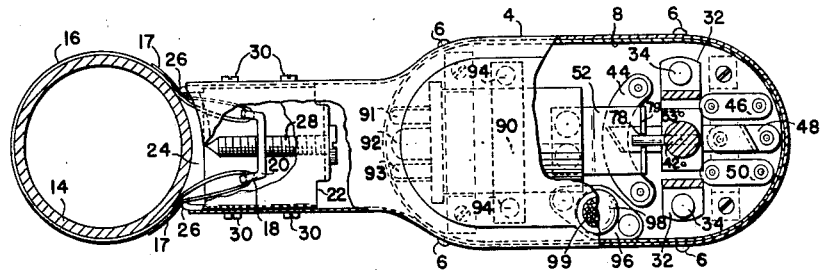
Figure 2 is a plan view of the switch assembly with the switch case partly cut away showing the section taken on the plane indicated by the trace 2—2 in Figure 1.

Referring to the figures there is shown a stamped metal switch case 4 to which is attached, by the use of four screws 6, a stamped metal switch case bottom member 8. Affixed to the bottom member 8 are the bracket members 10 supporting the switch assembly base plate 12. The base plate 12 is made of a resin impregnated fibre or other suitable insulating material and provides a mounting plate for the switch parts as will be hereinafter described.

The switch case is mounted on the steering column 14 by means of the steel strap 16 which is passed around the steering column, through slots 18 in the channel member 20 and is folded back in itself so that the ends 17 of the strap lay over the strap 16 against the steering column. The member 22 is a box-like member having an open end 24 adjacent to the steering column 14. The edges 26 of the open end of the box are brought to bear firmly against the strap 16 and folded back ends 17 by the action of the head of the screw 28. The screw 28 passes freely through the member 22 and the head of the screw rests upon member 22. The screw is threaded into the member 20. Thus, turning the screw draws the member 20 back into the box member 22 away from the steering column, pulling the strap tightly around the steering column, clamping the strap 16 and the ends thereof 17 firmly between the edges 26 of the box member 22 and the steering column thereby rigidly mounting the box member 22 against the steering column. The hole 29 in the side of member 22 is provided as a sight hole to facilitate the insertion of the screw 28 through the threaded bore in the member 20. After the member 22 is mounted to the steering column the switch case 4 is attached thereto by screws 30.

Riveted to the base plate 12 are the brass contact strips 44, 46, 48 and 50, the spring bracket 52 and the bracket 32. The bracket 32 is affixed to the base plate by rivets 34 and contains a centrally located bore 38 in alignment with the bore 40 in the switch assembly base plate 12. Rotatably mounted in the bores 38 and 40, as hereinafter described, is the switch shaft 42.

The uppermost portion 62 of the shaft 42 is of reduced diameter providing a mounting for the bracket 64 which rests on shoulder 65 and is held in position by the screw 66. The operating lever 68 is slidably mounted in the bore 70 in the shaft 42 and in the bore 72 in the turned down portion 86 of the bracket 64. The operating lever 68 passes through a slot 80 in the switch case 4 and provides a handle for convenient operation of the switch. The screw 74 which is threaded through the bracket 64 bears against the lever 68 locking it in position, preventing it from being withdrawn from the bores 70 and 72. It will be evident that the rod may be moved inwardly or outwardly of the switch case within the limits provided between the shaft 42 and the turned down portion 82 of the bracket 64. Thus the end portion 84 of the operating lever 68, which is provided to be gripped by the operator, may be positioned to his convenience.

The turned down portion 86 of the bracket 64 is curved and forms a close off plate back of the slot 80 in the switch case 4.

The insulating member 54 is made of a resin impregnated fibre or other suitable insulating material and contains a central bore which is pressed over the serrated portion 58 of the switch shaft 42 and bears against the shaft shoulder 43. The insulating member 54 is thus rigidly mounted to the switch shaft 42 and turns when the shaft is rotated. Attached to the insulating member 54 by rivets 53 is the metal plate 55, which has contact finger extensions formed by diagonal bends, as shown at 56 and 57, and is made of brass or other suitably conductive material having spring qualities. The contact finger extension 56 bears against the stationary contact strip 44 and the finger 57 bears against the contact strips 46, 48 and 50 as the switch is moved to various operating positions. It will be evident that the diagonal bend in the contact finger provides a contact surface which slides somewhat sideways over the stationary contacts as the switch shaft is rotated, providing what is effectively a wider sliding surface thereby reducing the wear and, yet, still retaining essentially the line contact which is the desirable construction for electrical contact surfaces.

The downward pressure provided by the bracket 32 bearing on the shoulder 60 of the upper portion of the shaft 42 provides the necessary pressure to cause the contact flexible fingers 56 and 57 to bear firmly against the stationary contact plates 44, 46, 48 and 50. Also mounted in the shaft 42 is the pin 76 which rests in the notch 78 in the spring bracket 52 when the operating lever is in a central position as shown.

When the operating lever is moved to one side or the other of the central position the pin moves out of the notch 78 and bears against the upturned edge 79 of the spring bracket 52. There is thus provided an indication for the operator allowing him to feel when the switch is in a central position as well as a lock which holds the switch in the central position until it is forcibly moved therefrom by the operator applying pressure to the operating lever.

Figure 1:
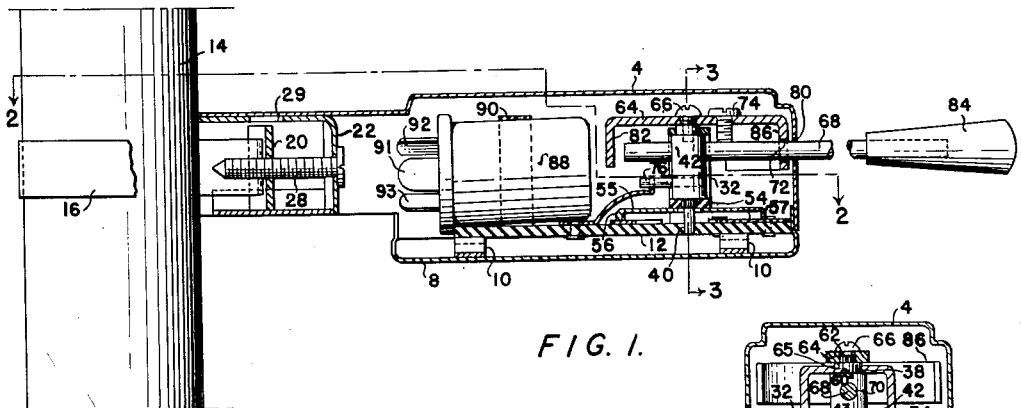
Figure 1 is an elevation of the switch assembly mounted on a steering column showing the case, the switch means and the mounting means in section.
Figure 3:
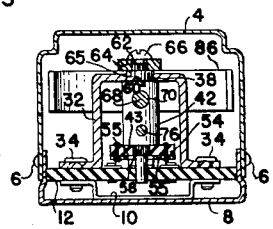
Figure 3 is an end elevation of the switch assembly showing a vertical section taken on the plane indicated by the trace 3—3 in Figure 1.

Riveted to the base plate 12 by the rivets 94 is the bracket 90 which retains the case 88 in which is mounted a flasher and relay assembly. The flasher and relay assembly may be of the type disclosed in the patent to Schmidinger 1,979,349 and provided with an auxiliary contact, or a similar flasher of suitable operating characteristics as will be hereinafter described. Extending outwardly from the base of the flasher case 88 are three connection lugs 91, 92 and 93. In the interest of clarity, wiring has been omitted from the Figures 1, 2 and 3. The interconnection wiring of the switch assembly contacts and the flasher contact lugs will be evident from the electrical diagram shown in Figure 4.

Also riveted to the base plate 12 is the pilot light lamp socket 96 in which is mounted the pilot light lamp 98. Mounted in the top of the switchcase directly above the pilot lamp 98 is the transparent jeweled element 99 which is so positioned as to be in the view of the operator.

Figure 4:
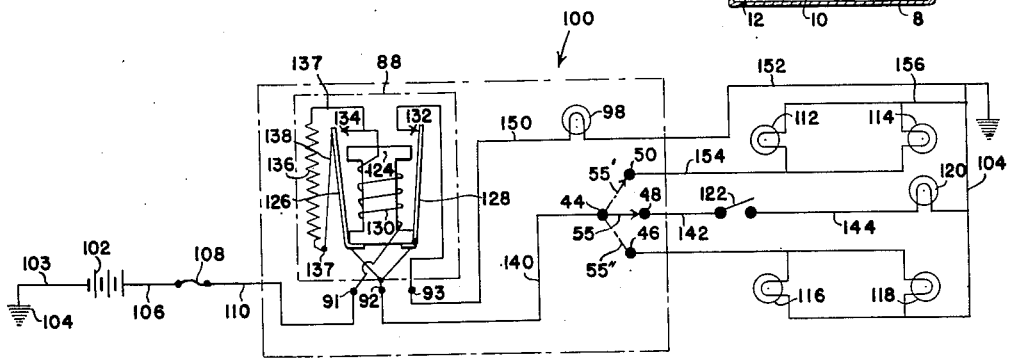
Figure 4 is a diagrammatical showing of the electrical circuit employed in the present invention.

Referring to Figure 4, showing the electrical circuit employed in the present invention, there is shown generally at 100 the wiring diagram of the control switch assembly, including within the outline 88, the flasher and relay assembly having the connection points 91, 92 and 93, and which will be hereinafter described in detail. Also included within the switch assembly is the pilot light 98 and the switch contact arm 55 and the contacts 44, 46, 48 and 50.

The battery 102, which is generally the battery included in the electrical system of the motor vehicle on which the signal system is installed, is grounded in the conventional fashion through conductor 103 to ground 104, the other side of the battery is connected through lead wire 106, fuse member 108 and lead wire 110 to the connection point 91 of the flasher and relay assembly.

The signal lamp circuits include the front and rear right hand turn signal lights 112 and 114, respectively, the left hand front and rear turn signal lights 116 and 118, respectively, the rear stop light 120, and at 122 a conventional stop light control switch which operates from the vehicle braking system. The flasher and relay assembly comprises an armature member 124 around which is wound the armature coil 130 and on which is mounted the movable contact arms 126 and 128. The flasher operation is controlled by the current limiting resistor 136 and the thermal element 138 which are made of a high resistance heat resistant wire. The normal spring action of the flexible contact arm 126 urges the arm to move toward the armature and to contact the contact 134. The thermal element, however, extending between the arm 126 and the fixed point 137, holds the arm 126 away from the contact 134.

When a potential is applied across the connection points 91 and 92 a current will flow through the armature coil 130, resistance 136, thermal element 138 and through the arm 126 to the connection point 92. This current flow is limited by the current limiting resistor 136 to a value which will not produce sufficient magnetic field to cause the flexible contact arm 128, which is held in open position by its own spring action, to be drawn against the armature 124. The current is sufficient, however, to heat the thermal element 138 which, upon heating expands, thus allowing the contact arm 126 to move inwardly gradually and, after a period of time, preestablished for the value of potential applied, to make contact with contact 134. When this contact is made the current flow will increase to a value determined by the capacity of the lamps in the circuit, and the increased current flow through the armature coil 130 will produce a sufficient magnetic field to hold the contact arm 126 firmly against the armature 124 and also may, as will be hereinafter described, cause the contact arm 128 to close against the armature 124 and contact 132.

When the contact arm 126 engages contact 134 the high resistance 136 and the thermal element 138 are bypassed reducing the current through the thermal element to essentially a zero value, thus permitting the thermal element to cool and contract. When the tension developed in the thermal element by contraction therein is sufficient to overcome the magnetic effort of the armature field the movable arm 126 will be drawn away from the armature 124 breaking the contact 134. The current limiting resistor 136 and the thermal element 138 are thus again included in the circuit and another period of heating is begun during which time only a limited current will flow through the circuit. During this period of limited current flow the contact arm 128 will, by its own spring action, be drawn from the armature 124 and the contact 132 will be open.

With the switch operating lever in the position shown in the figures the movable switch arm 55 will be in the position connecting contact points 44 and 48, as shown in Figure 4. With the switch in this position an operation of the stop light switch 122, which will occur in a conventional fashion in conjunction with an operation of the vehicle braking system, will establish a circuit permitting current to flow from the battery 102, one side of which is grounded at 104, through the lead wire 106, fuse member 108, lead wire 110, armature coil 130, current limiting resistor 136, thermal element 138, contact arm 126, lead wire 140, signal switch parts 44, 55 and 48, lead wire 142, stop light switch 122, lead wire 144, and stop light lamp 120 to the common ground 104.

Due to the high resistance of the path through the limiting resistor 136 and the thermal element 138, insufficient current will pass to illuminate the lamp 120. The current is sufficient, however, to heat the wire 136. The heat wire expands allowing the contact arm 126 to move inwardly toward the armature 124 and to ultimately make contact with the contact point 134. When this contact is established the resistor 136 and the thermal element 138 are bypassed and a low resistance circuit is established through the flasher, and the current flow is dependent upon the resistance of the lamp member 120.

The current which flows through the armature coil 130 when the lamp 120 is illuminated, creates a magnetic field in the armature 124 of sufficient intensity to close contact member 128 against the contact point 132 thereby closing the circuit between connection points 92 and 93 permitting current to flow from the battery 102 to contact point 92 as has been previously described and from connection 92 to connection point 93, through connecting wire 150, the lamp 98 and through wire 152 to the common ground 104.

As has been hereinbefore described, upon the closing of the contact arm 126 against contact point 134 substantially no current will flow through the resistance 136 and the thermal element 138. Thus, the thermal element will cool and contract and, when sufficient tension has developed, will draw the contact arm 126 away from the armature 124 breaking the contact at 134 and again imposing into the circuit the resistance 136 and the thermal element 138 thus limiting the flow of current through the circuit to a value below that which is required to illuminate the lamp 120.

This reduced current value through coil 130 is immediately followed by a reduction in magnetic field whereupon the contact arm 128 will drop out, opening contact 132, interrupting the current through the pilot lamp. After a heating interval the thermal element 136 will again have expanded sufficiently to allow the contact arm 126 to move inwardly making connection with contact 134 and the above described operation is repeated. Thus there exists a flasher system which, so long as a circuit is completed to ground, will continue to operate and if the current passing through the coil 130 is above the value required to create sufficient magnetic field to close the contact member 128 against its own spring tension, the member 128 will close and open in conjunction with the flashing operation of the flasher, thus causing the pilot light to blink simultaneously with the blinking of the signal lamp.

When the operating lever 68 is moved by the operator to a position to indicate, for example, a right hand turn the movable switch member 55 will assume the position 55', shown in construction lines, connecting the contact 44 with the contact 50. In this position of the signal switch, the current will flow from the battery 102 through the fuse 108 and the flasher assembly, as hereinbefore described, connecting wire 140, contact members 44, 55' and 50, the wire 154 and to the right hand front and rear signal lamps 112 and 114, respectively, to the common ground 104. It will be evident that the turn lights 112 and 114 will cause a flasher signal to operate in a manner identical to that of stop light 120. However, it should be noted that when the signal switch member 55 is in the position of contacting either contact member 50, in the case of a right-hand turn, or contact member 46, in the case of a left-hand turn, that a simultaneous operation of the stop light switch 122 will not cause a current to flow through a stop light 120 because of the fact that there is an open circuit between contact members 44 and 48.

When the operating lever is moved to a position to indicate a left-hand turn the switch member will assume the position shown by 55'', the left-hand turn lamps 116 and 118 will be energized and the system will operate as described above in connection with the right-hand turn lights.

The turn lights and the stop lights are selected to be of such capacity that the current flow through each of the three circuits will be approximately equal. For example, each of the turn lamps could be selected to draw three amperes and the stop light lamp selected to draw six amperes, or if two stop light lamps were employed they would be selected so that each one would draw three amperes. Thus, when operating under either the stop light load or the right-hand or left-hand turn signal load the flasher armature would be carrying six amperes when the contact 134 was closed, and only a small fraction of that value when the contact 134 was open and all the current in the circuit was passing through the current limiting resistor 136 and the thermal element 138. The spring tension of the contact arm 128 is adjusted, for use in a system having a normal six ampere load such as just described, so that six amperes through the armature coil would produce a sufficient magnetic field to draw the arm 128 against the armature and close the contact 132, thus causing the pilot light to blink in conjunction with the blinking of the stop or turn signal lamps. However, in the event of a failure of one of the signal lamps, the armature current would be reduced to three amperes and the spring tension of the contact arm 128 would be sufficient to prevent the magnetic field caused by the three ampere current from drawing the contact arm 128 against the armature and closing the contact 132. Therefore, the pilot light would not light and the operator would be aware of any failure in the system.

It should be particularly noted that in the present signal system the pilot light can operate only when the flasher contact 134 is closed and when the pilot light contact 132 is also closed. When the flasher is in a heating period the pilot light contact 132 is open, therefore, there is no common current through the flasher thermal element and the pilot light. Thus the operation of the flasher is entirely independent of the load imposed by the pilot light circuit.

It will be obvious that a relay having an armature coil similar to the coil 130 directly connected across connection points 91 and 92 may be employed in place of the flasher assembly shown affecting the omission of the flasher parts 126, 134, 136, 137 and 138. Such an apparatus would operate identically to the one described with the exception of the omission of the flashing feature.

What I claim and desire to protect by Letters Patent is:

1. A control switch assembly for use in an automotive signal lighting system having a pair of turn light signal circuits and a stop light signal circuit, said control switch assembly comprising a manually operated switching means, three contacts adapted to be selectively engaged by said switching means, one of said three contacts being connected to the stop light signal circuit and the other two of said contacts each being connected to one of the turn light signal circuits, a pilot light, a flasher mechanism connected between a source of power and said switching means, said flasher mechanism including a coil and contact means for repeatedly interrupting the flow of current from the current source to one of said signal circuits through said switching means, and a second contacting means associated with said flasher and connected between the source of power and said pilot light, said second contacting means maintaining an open circuit between the power source and said pilot light when said signal circuits are all disconnected from the power source by said switching means.

2. A control switch assembly for use in an automotive signal lighting system having a pair of turn light signal circuits and a stop light signal circuit, said control switch assembly comprising a switching means, said switching means including a manually rotatable member, a contact leaf mounted on said member said leaf having one of its ends bent with respect to the plane of the strip and on a line other than a line normal to the longitudinal axis of the strip, and three contacts adapted to be selectively engaged by the bent end of said contact leaf, one of said three contacts being connected to the stop light signal circuit and the other two of said contacts each being connected to one of the turn light signal circuits, a pilot light, a flasher mechanism connected between a source of power and said switching means, said flasher mechanism including a coil and contact means for repeatedly interrupting the flow of current from the current source to one of said signal circuits through said switching means, and a second contacting means associated with said flasher and connected between the source of power and said pilot light, said second contacting means maintaining an open circuit between the power source and said pilot light when said signal circuits are all disconnected from the power source by said switching means.

THOMAS F. YOUNG.

REFERENCES CITED

The following references are of record in the file of this patent:

UNITED STATES PATENTS

| Number | Name | Date |
|---|---|---|
| 2,005,963 | Axelberg | June 25, 1935 |
| 2,010,454 | Haltrich et al. | Aug. 6, 1935 |
| 2,063,003 | Curtiss | Dec. 1, 1936 |
| 2,103,276 | Schmidinger | Dec. 28, 1937 |
| 2,141,210 | Foulks | Dec. 27, 1938 |
| 2,188,451 | Bartens | Jan. 30, 1940 |